United States Patent [19]

Ohkuma et al.

[11] Patent Number: 4,688,978

[45] Date of Patent: Aug. 25, 1987

[54] COMPONENT DISTRIBUTION DEVICE

[75] Inventors: Kuniaki Ohkuma; Kazuyoshi Sakuma; Hisao Miyao, all of Saitama; Shinichi Yoshimura, Tokyo; Hideharu Koizumi; Yoshitake Miwa, both of Saitama, all of Japan

[73] Assignee: Honda Giken Kogyo Kabushiki Kaisha, Tokyo, Japan

[21] Appl. No.: 727,405

[22] Filed: Apr. 25, 1985

[30] Foreign Application Priority Data

Apr. 25, 1984 [JP] Japan ................................ 59-84948
Apr. 25, 1984 [JP] Japan ................................ 59-84949

[51] Int. Cl.$^4$ .............................................. B65H 1/00
[52] U.S. Cl. .................................... 414/224; 198/429; 221/93; 414/417; 414/744
[58] Field of Search ............... 414/224, 331, 403, 404, 414/417, 744 R; 198/425–427, 429, 431, 436, 468.9, 550.5, 465.1; 221/93, 94

[56] References Cited

U.S. PATENT DOCUMENTS

| | | | |
|---|---|---|---|
| 2,470,795 | 5/1949 | Socke | 198/429 X |
| 2,926,673 | 3/1960 | Bernard | 221/93 X |
| 3,187,940 | 6/1965 | Harris | 414/417 X |
| 4,265,355 | 5/1981 | Davis | 198/436 X |
| 4,388,035 | 6/1983 | Cayton et al. | 414/417 |
| 4,394,902 | 7/1983 | Mazzoni | 198/436 |
| 4,492,297 | 1/1985 | Sticht | 198/465.1 X |
| 4,501,063 | 2/1985 | McNeely | 414/224 X |
| 4,551,913 | 11/1985 | Campisi | 414/224 X |

FOREIGN PATENT DOCUMENTS

115518 9/1980 Japan .................................. 414/224

Primary Examiner—Frank E. Werner
Assistant Examiner—David A. Bucci
Attorney, Agent, or Firm—Irving M. Weiner; Joseph P. Carrier; Pamela S. Burt

[57] ABSTRACT

A component distribution device comprises a base structure disposed within an effective working region of component supply points, and a pallet engageable with and disengageable from the base structure, the pallet having a distribution plate adapted to hold the components as fed from a component source and force same to move to the component supply points.

10 Claims, 13 Drawing Figures

COMPONENT DISTRIBUTION DEVICE

BACKGROUND OF THE INVENTION

1. Field of the Invention

The present invention relates generally to a component distribution device. More particularly, the invention relates to a component distribution device of a type in which a plurality of components are distributed to be supplied simultaneously to a plurality of given supply points.

2. Description of Relevant Art

As a component distribution device of such type, there has been known one disclosed in Japanese Utility Model Publication No. 53-44220 (published on Oct. 24, 1978), in which many components adjacent to one another, are fed from a chute located on a hopper side, and are dropped all at once into a plurality of grooves which function as supply points on a table. Accordingly, when the supply points are adjacent to one another, the components can be effectively distributed to be supplied. However, in a case where the supply points are spaced apart by a large distance or at irregular intervals, it is considerably difficult to ensure smooth distribution for supply of the components.

Moreover, in a conventional component distribution device, there has been employed a system, in which bar-like materials, as the components fed from a hopper to the distribution device, are supplied all at once into a plurality of grooves as supply points on a table. In such a system, the number of bar-like materials to be simultaneously fed from the hopper as a component source to the distribution device must be exactly as predetermined. However, the supply of such an exact number of components is difficult to achieve, and requires a remarkably complex control mechanism for the achievement, thus adversely affecting the cost saving of the distribution device itself.

On the other hand, the present applicant has proposed, in Japanese Patent Application No. 57-218932 (laid open on June 23, 1984), an application device for pressing to fit valve seats into a cylinder head. In this respect, still more particularly, the present application is directed to a component distribution device for supplying to an application device a plurality of valve seats as components to be pressed to fit in cylinder heads. Conventionally, application devices of the type disclosed by Japanese Patent Application No. 57-218932 have been each exclusively intended for a single cylinder head model. Similarly, each of the component distribution devices intended for supplying components to one of such application devices has an exclusive structure which depends on the size, number, and supply points of the components to be supplied. Such application devices and their corresponding component distribution devices have, therefore, been disadvantageous in small quantity production of many models of cylinder heads.

SUMMARY OF THE INVENTION

The present invention has been achieved to effectively overcome such problems associated with a conventional component distribution device.

According to the present invention there is provided a component distribution device for distributing to supply a plurality of components, as fed from a component source, to a plurality of component supply points. The distribution device according to the present invention comprises a base structure disposed within an effective working region defined by the component supply points, and a pallet assembly engageable with and disengageable from the base structure. The pallet assembly includes a pallet body engageable to be held with the base structure, the pallet assembly being provided with a chute for arranging the components as fed from a component source, a distribution plate connected to the pallet body so as to be movable in a first direction oriented from the base structure to the component supply points, and a push member for pushing out the components of the chute toward the distribution plate.

Accordingly, an object of the present invention is to provide a component distribution device which permits a plurality of components as fed from a component source to be firmly and smoothly supplied to a plurality of component supply points, even when the component supply points are spaced apart at irregular intervals. A further object of the present invention is to provide a component distribution device which can favorably cope with an object item to be supplied with the components, which object item may be of a small-quantity production type having many variants.

The above and further features, objects and advantages of the present invention will more fully appear from the following detailed description of a preferred embodiment of the invention when the same is read in conjunction with the accompanying drawings.

DETAILED DESCRIPTION OF PREFERRED EMBODIMENT

Referring first to FIGS. 1A to 1E, which are schematic plan views of a component distribution device according to the preferred embodiment of the invention, designated at reference numeral 11 is the component distribution device adapted to distribute a pair of sets of valve seats 52a, 52b (only 52b shown in FIG. 1E) as components to be distributed for transfer to a pair of lines of application bars 3a, 3b as points to be supplied therewith of a valve seat appllication device 1a arranged within an effective working range of the component distribution device 11.

The application device 1a is adapted for applying, by pressing to fit in with the application bars 3a, 3b, the valve seats 52a, 52b to each of a set of cylinder heads 2 held in predetermined positions thereof with a supporting mechanism (not shown), the cylinder heads 2 being intended to be employed for a type of internal combustion engine (not shown). The application bars 3a, 3b are arranged in two vertical lines by eight rows, and controlled to thereby press to fit each pair of valve seats 52a 52b, one for an intake use and the other for an exhaust use, in each of the cylinder heads 2 as arranged in a vertical line.

The function itself of the component distribution device 11, as well as of the application device 1a cooperating therewith, will be described later.

For ease of understanding, it will be understood that, in each of FIGS. 1A to 1E, the left and right correspond to the front and rear of the distribution device 11, and the top and bottom, to the right and left thereof, respectively. Moreover, throughout the description herein, the front-rear direction, left-right direction, and top-bottom direction of the distribution device 11 will be referred to as longitudinal, transverse, and vertical directions thereof, respectively.

Figure 1A:
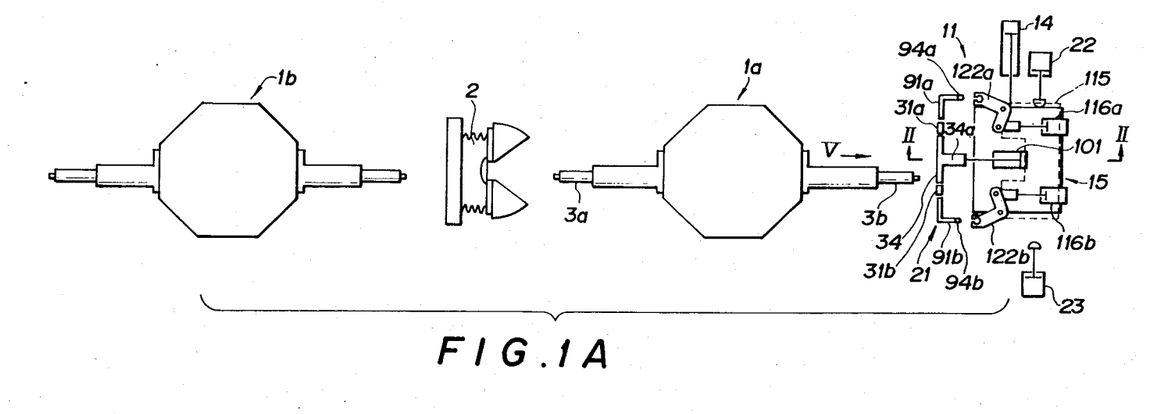
FIGS. 1A to 1E are schematic plan views of a component distribution device according to the preferred embodiment of the invention and a component application device to be supplied with components therefrom, showing a working sequence of the distribution device.

In FIG. 1A, designated at reference character 1b is another application device for applying, by pressing to fit in, a pair of sets of valve guides (not shown) to the cylinder heads 2, when applying thereto the valve seats 52a, 52b as aforementioned. The device 1b has a function not directly related to the application device 1a and will not be further described herein.

Figure 2:
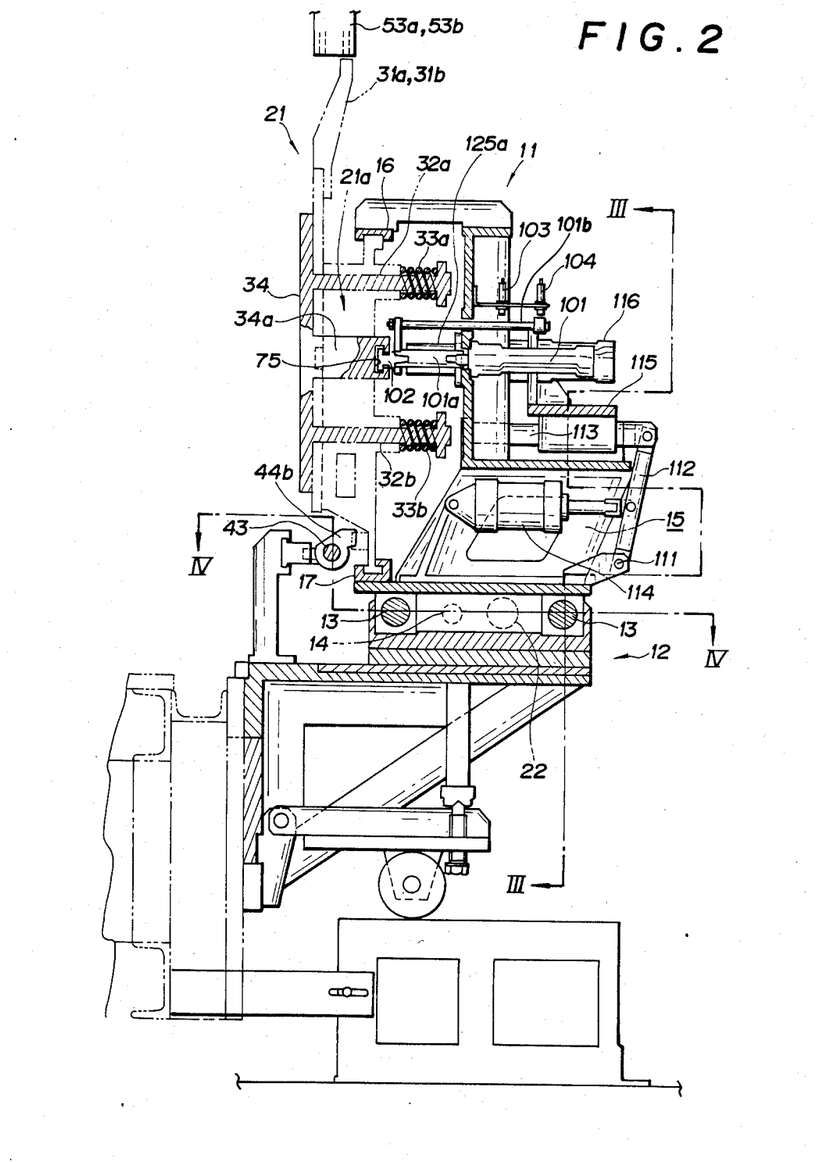
FIG. 2 is a sectional view taken along line II—II of FIG. 1A, showing a longitudinally central vertical section of the distribution device.
Figure 3:
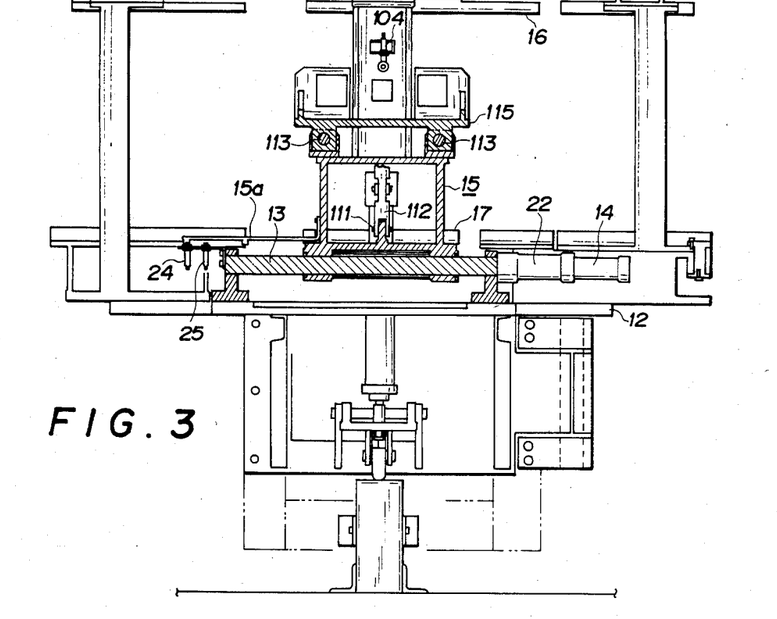
FIG. 3 is a sectional view taken along line III—III of FIG. 2, showing a partially cut-away rear elevational view of the distribution device.
Figure 4:
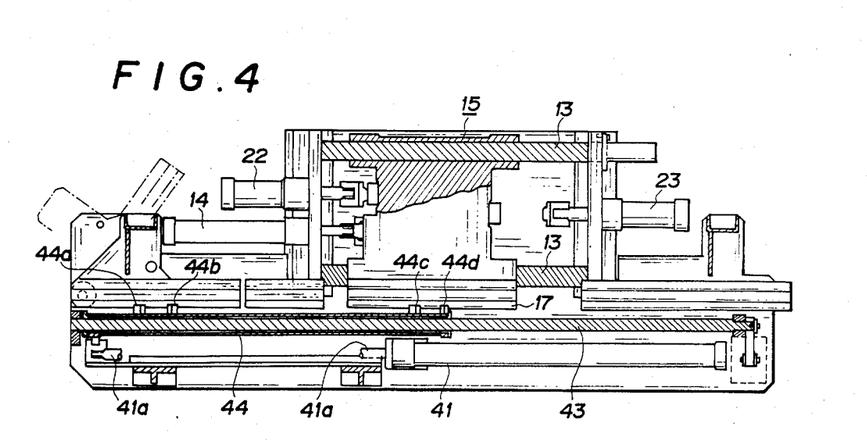
FIG. 4 is a sectional view taken along line IV—IV of FIG. 2, showing a partially cut-away plan view of the distribution device.

Referring now to FIGS. 2 to 5, the distribution device 11 is mounted on a base structure 12 on which it has transversely arranged to be fixed front and rear guide rods 13, 13 for transversely guiding a mobile structure 15 adapted to be transversely (perpendicularly to the valve seat pressing direction) driven with a transverse cylinder 14. The base structure 12 is provided, on the front thereof, with transversely extending upper and lower rails 16, 17 for transversely slidably supporting a pallet assembly 21, and has a variable transverse position thereof determined with transversely arranged right and left stoppers 22, 23 which are both adjustable in the transverse positions thereof. In the present embodiment, the stoppers 22, 23 comprise a pair of power cylinders. For the detection of the transverse position of the mobile structure 15, as shown in FIG. 3, the distribution device has a pair of sensors 24, 25 adapted to cooperate with a slender plate 15a transversely outwardly projected from the left side of the structure 15.

The pallet assembly 21 comprises a pallet body 21a, right and left chutes 31a, 31b vertically extending at the right and left sides of the body 2a, and a distribution plate 34 arranged between the chutes 31a, 31b and formed with rearwardly projected upper and lower guide rods 32a, 32b longitudinally slidably provided through the body 21a, the guide rods 32a, 32b being resiliently held to the body 21a by means of upper and lower springs 33a, 31b, respectively. As well as each of the chutes 31a, 31b, the distribution plate 34 has a variable design in accordance with cylinder head type.

In a vertically intermediate portion of the distribution device 11, at the front part thereof, there is provided a transversely extending rod 43, on which is transversely slidably fitted a sleeve 44 having four hooks 44a to 44d. The sleeve 44 is driven to slide by a rod 41a of a transversely extending front power cylinder 41 disposed in the front part of the device 11.

The pallet assembly 21 is set on the base structure 12 by first having the hooks 44a to 44d applied on the pallet assembly 21 and then driving to slide the pallet assembly 21 with the front power cylinder 41, thereby bringing the pallet body 21a into engagement at the upper and lower ends thereof with the upper and lower rails 16, 17, respectively. When the pallet assembly 21 is driven to slide in position on the base structure 12, the distribution plate 34 is brought, as will be described later, into engagement with the front end of a longitudinally extending auxiliary power cylinder 101 disposed in the transversely central part of the mobile structure 15, as well as with right and left engagement pins 125a, 125b projected forwardly from a bracket 115 secured to the mobile structure 15. Under such condition, the right and left chutes 31a, 31b are connected to upper right and left chutes 53a, 53b, respectively. The upper chutes 53a, 53b are adapted to downwardly feed, therethrough, the valve seats 52a, 52b from right and left hoppers 51a, 51b, respectively, and are provided with right and left lock arms 55a, 55b having right and left power cylinders 54a, 54b adapted to start and stop the downward feeding of the valve seats 52a, 52b.

The lower right and left chutes 31a, 31b are formed with right and left vertical passages 61a, 61b downwardly extending therethrough, respectively, which passages 61a, 61b are closed at the lower ends thereof with right and left bottom surfaces 62a, 62b defined by the pallet body 21a, so that the valve seats 52a, 52b are piled up one on one in right and left substantially straight lines, respectively.

Figure 6:
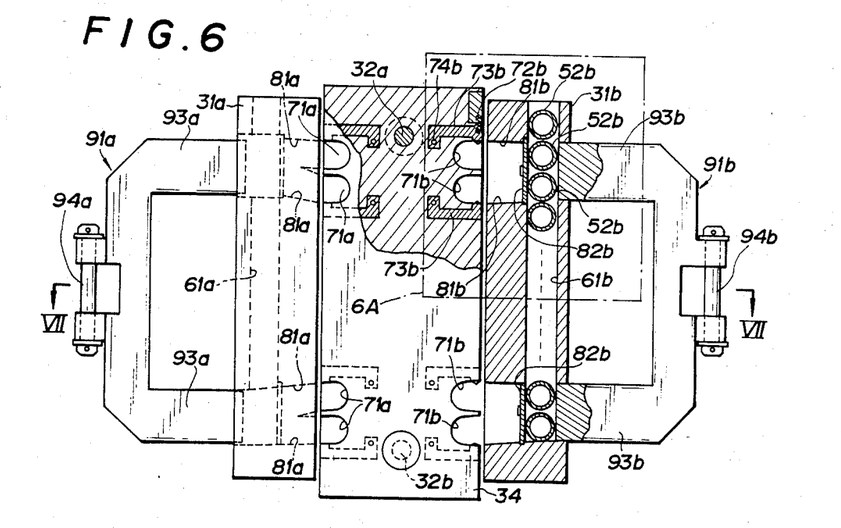
FIG. 6 is a partial front view, partly in section, of a pallet assembly of the distribution device.

The distribution plate 34 has at the right and left sides thereof eight right and left engagement grooves 71a, 71b, respectively, formed therein, in right and left four pairs in which paired ones are close to each other, in a one-to-one correspondence manner to respective valve holes of the cylinder heads 2 in which the valve seats 52a, 52b are to be fitted by pressing. The right and left engagement grooves 71a, 71b are open at the right and left sides thereof facing the right and left chutes 31a, 31b, respectively, and have vertical positions thereof each respectively coincident with the vertical position of a corresponding one of the application bars 3a, 3b. As shown in FIG. 6, each combination of paired ones of the left engagement grooves 71b as well as of the right engagement grooves 71a has in the vicinity thereof upper and lower left lock arms 73b each respectively pivoted through a left pin 74b on the distribution plate 34 and resiliently biassed with a left spring 72b so as to hold to lock in a corresponding one of the engagement grooves 71b one of the valve seats 52b as fed thereto from the lower left chute 31b. Moreover, as shown in FIG. 2, the distribution plate 34 is formed on the back thereof with a rearwardly projected portion 34a having at the rear end thereof a transversely opened groove 75 recessed therein.

Incidentally, in FIG. 6, for easier comprehension, the right and left engagement grooves 71a, 71b in the distribution plate 34 are typically represented by highest and lowest pairs thereof, without showing the rest. For the same reason, the lock arms 73b are shown for each of the highest and lowest pairs of left engagement grooves 71b, as well as the pivot pin 74b therefor and the biassing spring 72b for the highest left engagement groove 71b, whereas each left engagement groove 71b has like members, as well as each right engagement groove 71a having similar lock arm, pin, and spring. Such simplification of representation will be found also in conjunction with later-described right and left push pieces 93a, 93b of right and left push plates 91a, 91b in the pallet assembly 21.

In the present embodiment, each of the right engagement grooves 71a is adapted to lock therein one of the valve seats 52a as now assumed each to be for an exhaust valve (not shown) of one of the cylinder heads 2, and the left engagement grooves 71b, to lock the valve seats 52b to be each assumed as for an intake valve (not shown) of same.

Right and left halves of the pallet assembly 21 are substantially symmetrical with each other, though there may exist more or less difference therebetween when viewed concretely. For the facilitation of comprehension, the description of the pallet assembly 21 as well as that of those parts in cooperation therewith will principally be made of the left half.

Figures 7, 8, 9:
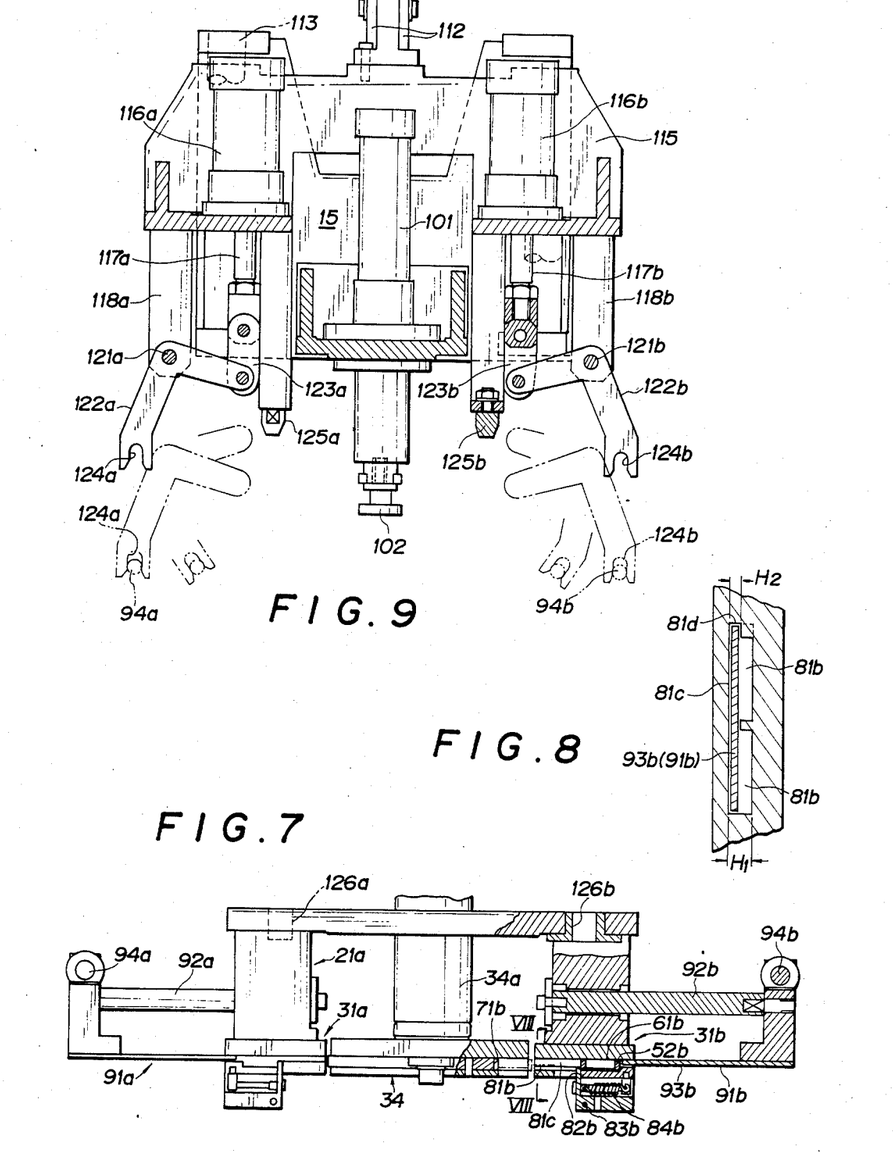
FIG. 7 is a sectional view taken along line VII—VII of FIG. 6, showing a partially cut-away plan view of a distribution plate of the pallet assembly.
FIG. 8 is a sectional view taken along line VIII—VIII of FIG. 7.
FIG. 9 is an enlarged plan view of an essential part of the distribution device of FIG. 1A.

Referring now to FIGS. 6 and 8, particularly with reference to an area 6A enclosed by broken line of FIG. 6, opposite to each pair of engagement grooves 71b of the distribution plate 34, the chute 31b has transversely formed therein upper and lower communication paths 81b, 81b adjacent to each other. Through paths 81b, 81b a pair of the upper and lower engagement grooves 71b communicate with the passage 61b where two of the valve seats 52b would be correspondingly located, and whereby these two valve seats 52b are permitted to be fed into the upper and lower engagement grooves 71b. The communication paths 81b are so formed as to horizontally extend or vertically slant. The particular configuration of the paths 81b depends on factors such as the level of the corresponding engagement grooves 71b and the position of the corresponding valve seats 52b.

As shown in FIGS. 6 and 7, in the region where the paired upper and lower communication paths 81b open to the passage 61b, there is provided a cover member 82b pivotable about a vertical pivot pin 83b and adapted to be moved toward the distribution plate 34 to close the communication paths 81b and opposite thereto to open same. The cover member 82b is normally biassed by a coil spring 84b in the closing direction thereof so as to be contiguous to the inside wall of the passage 61b.

Moreover, the pallet assembly 21 has at the right and left sides thereof a pushing member, that is, the push plate 91b, for pushing out the valve seats 52b of the passage 61b toward the distribution plate 34, and into the engagement grooves 71b. The push plate 91b is adapted to be transversely slidable and insertable into the chute 31b by means of a guide rod 92b. At the outer end of the left push plate 91b, as well as of the right push plate 91a, there is provided therebehind a vertically extending rod 94b secured thereto.

Figure 5:
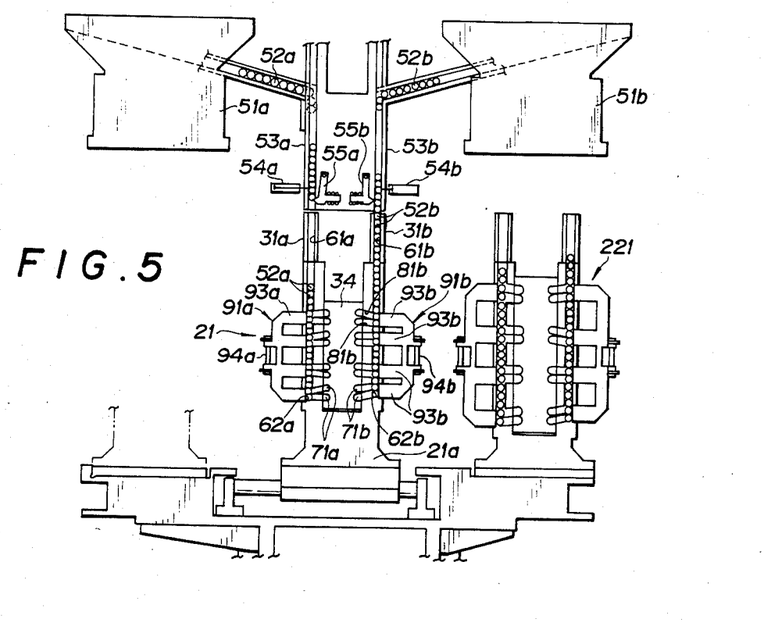
FIG. 5 is a front view of the distribution device as viewed along arrow V of FIG. 1A, with rear side parts thereof omitted.

The push plate 91b includes the push pieces 93b, four in total at the left of the distribution plate 34 as well as at the right thereof. Each of the push pieces 93b has, as seen from FIG. 8, a predetermined longitudinal thickness smaller than respective longitudinal gap dimensions (each H1) of the passage 61b and the communication paths 81b, and a predetermined vertical width sufficient to push out the valve seats 52b in pairs. In other words, the push plate 91b is formed with a thickness smaller than the gap dimensions H1 of the passage 61b and the communication paths 81b, and each push piece 93b, with a height slightly smaller than the sum of respective heights of two of the valve seats 52b, as can be seen from FIG. 6. Each push piece 93b of the push plate 91b is guided to slide along a transverse guide slot 81c, which is formed with a longitudinal gap dimension H2 larger than the thickness of the push pieces 93b but smaller than the gap dimension H1 of the communication paths 81b, thus effectively permitting the push piece 93b to slide therealong to push out the two valve seats 52b as fed therein. In the present embodiment, the guide slot 81c is horizontally oriented so as to effectively permit the sliding of the push plate 91b in the horizontal direction, that is, perpendicularly to the vertical passage 61b, to thereby make smooth the movement of the valve seats 52b through the communication paths 81b to the engagement grooves 71b. As shown in FIG. 8, the guide slot 81c has at the upper end thereof a stepped recess portion 81d upwardly stepped from the upper end of the upper communication path in the region where the communication paths 81b, vertically slanting when viewed from ahead thereof as shown in FIG. 5, meet the guide slot 81c in a crossing manner when viewed from ahead thereof. This configuration allows the push piece 93b to be smoothly and horizontally slid toward corresponding ones of the engagement grooves 71b.

The distribution plate 34 is adapted to be longitudinally slidable with the auxiliary power cylinder 101 longitudinally arranged to be secured to the mobile structure 15 as shown in FIG. 6. The auxiliary cylinder 101 includes a lock member 102 fixed to the front end of a rod 101a thereof. The lock member 102 is brought into engagement with the transverse groove 75 of the rearwardly projected portion 34a of the distribution plate 34, when the pallet assembly 21 is carried in position, so that the communication paths 81a, 81b are caused to communicate with the corresponding engagement grooves 71a, 71b, and when the auxiliary cylinder 101 is operated into a contracted position thereof. In FIG. 2, designated at reference numerals 103, 104 are position sensors adapted to cooperate with a slender rod 101b, which is arranged to rearwardly extend from the front end of the rod 101a, to detect the working position of the auxiliary cylinder 101, that is, the longitudinal position of the distribution plate 34.

The mobile structure 15 has disposed on the rear side thereof an ascending link 112, which is pivoted thereon at the lower end part thereof by means of a transverse pin 111 and adapted to make a pivotal movement about the pin 111 by a longitudinally arranged main power cylinder 114, and the bracket 115 intended for supporting the pallet assembly 21. The bracket 115 is slidably fitted at each transverse side thereof on right and left longitudinal guide rods 113, 113 and longitudinally movable in accordance with the pivotal movement of the link 112 by the cylinder 114. As shown in FIG. 9, the bracket 115 is provided with right and left arm-actuating power cylinders 116a, 116b fixed thereon to be located longitudinally opposite to the right and left push plates 91a, 91b of the pallet assembly 21, respectively. Further, bracket 115 has secured thereto at the right and left sides thereof right and left support members 118a, 118b projected forwardly therefrom to extend along rods 117a, 117b of the right and left cylinders 116a, 116b, respectively. The support members 118a, 118b support at the front ends thereof right and left horizontal arms 122a, 122b pivoted thereon at central bent portions thereof by means of right and left vertical pivot shafts 121a, 121b, respectively. The arms 122a, 122b have rear base portions thereof connected at the transversely inner ends thereof through right and left links 123a, 123b to the rods 117a, 117b of the cylinders 116a, 116b, respectively, and are formed at the front ends thereof with forwardly opened right and left recesses 124a, 124b which are adapted to be engageable with the vertical rods 94a, 94b of the right and left push plates 91a, 91b.

Following the carry-in of the pallet assembly 21 onto a transversely central position of the distribution device 11, the bracket 115 is driven to advance with the pivotal movement of the link 112 by the main cylinder 114 while keeping the rods 117a, 117b of the arm-actuating cylinders 116a, 116b in their forwardly stretched position, and then the recesses 124a, 124b of the arms 122a, 122b are brought into engagement with the vertical rods 94a, 94b and the frontwardly projected right and left engagement pins 125a, 125b of the bracket 115 are fitted into right and left engagement holes 126a, 126b formed at the rear side of the pallet assembly 21, thus fixing in position the bracket 115. Thereafter, when the rods 117a, 117b of the cylinders 116a, 116b are operated to retreat toward their contacted position, the right and left arms 122a, 122b turn about the vertical pivot shafts 121a, 121b counterclockwise and clockwise, respectively, when viewed from above as seen from FIG. 9. Accordingly, the right and left rods 94a, 94b engaged with the recesses 124a, 124b at the front ends of the right and left arms 122a, 122b are caused to transversely and inwardly move, respectively, thus forcing both push plates 91a, 91b toward the distribution plate 34, thereby pushing out the valve seats 52a, 52b of the chutes 31a, 31b into corresponding ones of the engagement grooves 71a, 71b in the distribution plate 34.

There will be described hereinbelow the function of the component distribution device 11 with respect to a process thereof in which the valve seats 52b for intake use are supplied eight each respectively to one of the left eight application bars 3b of the application device 1a, and, then, the valve seats 52a for exhaust use, likewise to the right eight application bars 3a thereof.

First, with the transverse cylinder 14, the mobile structure 15 is forced to move rightwardly into abutment with the right stopper 22, to be thereby positioned to be fixed. The bracket 115 is then put in a retreat position thereof by using the main cylinder 114. The auxiliary cylinder 101 on the bracket 115 is set in its contracted state, and the arm-actuating cylinders 116a, 116b, in their stretched state. Then, while bringing the hooks 44a to 44d of the sleeve 44 on the front side of the distribution device 11 into engagement with the pallet assembly 21, the front cylinder 41 is operated to carry the pallet assembly 21 into the central position of the device 11.

By the carry-in of the pallet assembly 21, the lock member 102 at the front end of the auxiliary cylinder 101 is caught in the transverse groove 75 of the rearwardly projected portion 34a of the distribution plate 34. The auxiliary cylinder 101 is then further contracted, making the distribution plate 34 matched with the lower right and left chutes 31a, 31b. This condition is shown in FIG. 1A which is a schematic plan view of the system involved.

Figure 1B:
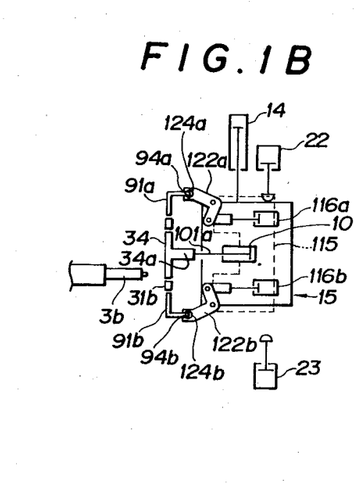

Then, as shown in FIG. 1B, by the main cylinder 114, the arm-actuating cylinders 116a, 116b are driven to advance integrally with the bracket 115, thereby causing the arms 122a, 122b to bring the recesses 124a, 124b thereof into engagement with the vertical rods 94a, 94b of the push plates 91a, 91b. At this time, the forwardly projected engagement pins 125a, 125b of the bracket 115 are fitted in the engagement holes 126a, 126b formed in the rear faces of the chutes 31a, 31b, whereby the mobile structure 15 and the pallet assembly 21 are fixedly engaged with each other. Thereafter, the pallet assembly 21 is released from the engagement with the hooks 44a to 44d. When the mobile structure 15 is engaged with the pallet assembly 21, the upper right and left chutes 53a, 53b from the hoppers 51a, 51b are connected to the lower right and left chutes 31a, 31b in the pallet assembly 21, respectively, and the right engagement grooves 71b of the distribution plate 34 are centered each respectively relative to a corresponding one of the application bars 3b.

Thereafter, by the cylinders 54a, 54b on the hopper side, the lock arms 55a, 55b are pivotally moved, feeding the valve seats 52a, 52b to the respective chutes 31a, 31b of the pallet assembly 21. When the valve seats 52a, 52b as fed have reached their predetermined number, the lock arms 55a, 55b are operated to stop further feeding of the valve seats 52a, 52b.

Figure 1C:
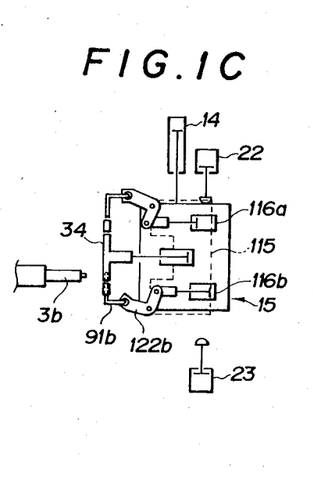

Next, as shown in FIG. 1C, by operating the left arm-actuating cylinder 116b to be contracted, the left arm 122b is actuated to cause the push plate 91b to slide toward the distribution plate 34, concurrently feeding eight valve seats 52b for intake use through the communication paths 81b into the left engagement grooves 71b. Upon completion of the feeding of the valve seats 52b, the left arm-actuating cylinder 116b is reset to the original state thereof.

Figure 1D:
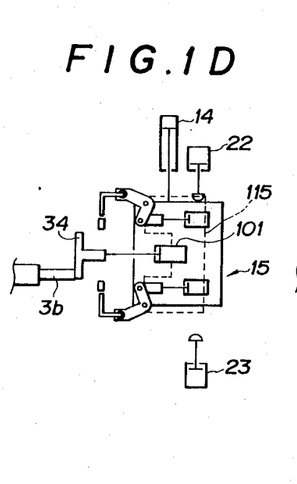

Then, as shown in FIG. 1D, by the auxiliary cylinder 101 to be operated to stretch, the distribution plate 34 only is forced to advance, while being guided with the guide rods 32a, 32b at the back thereof, whereby the application bars 3b are inserted into the valve seats 52b in the left engagement grooves 71b.

Figure 1E:
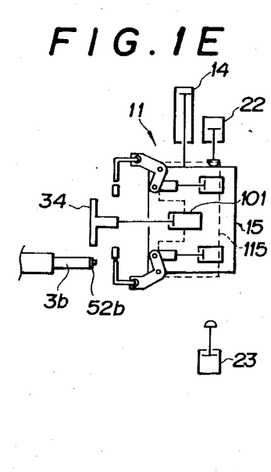

Next, as shown in FIG. 1E, by operating to contract the transverse cylinder 14, the distribution plate 34 is rightwardly slid together with the mobile structure 15, whereby the eight valve seats 52b are removed from the engagement grooves 71b and supplied to be set on the application bars 3b, completing the supply work of the valve seats 52b from the distribution device 11 to the application device 1a. In this work, the restriction to the leftward movement of the mobile structure 15 is effected with the right stopper 22, the stroke of which is changed in advance from that employed in the carry-in work.

Following the supply work of the valve seats 52b onto the application bars 3b, the auxiliary cylinder 101 is contracted to thereby force the distribution plate 34 to retreat to a position where it becomes matched with the right chute 31a, while giving a 180° horizontal revolution to the application device 1a to be turned into position where the application bars 3a for exhaust valve use face the distribution device 11. At this time, the right arm 122a is brought into engagement with the vertical rod 94a of the right push plate 91a.

The supply work of the valves seats 52a for exhaust use onto the application bars 3a is to be made symmetrically with that of the valve seats for intake use. First, contrary to the state shown in FIG. 1B, the positioning of the mobile structure 15 is established by using the transverse cylinder 14 and the stopper 23, to have the right eight engagement grooves 71a of the distribution plate 34 centered each respectively to a corresponding one of the eight application bars 3a. Then, with the right arm-actuating cylinder 116a to be operated to contract, the eight valve seats 52a in the right chute 31a of the pallet assembly 21 are fed concurrently by the right push plate 91a into the right eight engagement grooves 71a in the distribution plate 34. Thereafter, the distribution plate 34 only is forced to advance, by the auxiliary cylinder 101, causing the application bars 3a to be inserted into the valve seats 52a, before again operating the auxiliary cylinder 14 to force the distribution plate 34 to the left together with the mobile structure 15, thereby having the valve seats 52a removed from the engagement grooves 71a and supplied to be set on the application bars 3a, finishing the supply work of the seat valves 52a from the distribution device 11 to the application device 1a.

Incidentally, the above-described process is encoded to be stored in a memory of an unshown control system adapted to control all cylinder operations involved, so that the foregoing distributive supply of the valve seats 52a, 52b is automatically effected from the distribution device 11 to the application device 1a.

Therefore, according to the present embodiment, the valve seats 52a, 52b located at respective positions corresponding to the application bars 3a, 3b as points to be supplied therewith are pushed out by the push plates 91a, 91b from the chutes 31a, 31b at both sides of the pallet assembly, to be fed to the distribution plate 34, thus ensuring an exact feeding of the valve seats 52a, 52b to the distribution plate 34 even in a case where the interval and the like between respective neighboring ones of the engagement grooves 71a, 71b are irregular in dependence on the configuration of the cylinder head 2 to be finally applied with the valve seats 52a, 52b. The valve seat supply from the distribution plate 34 to the application bars 3a, 3b is effected by transversely sliding the distribution plate 34 itself to take out the valve seats 52a, 52b from respective open ends of the engagement grooves 71a, 71b, so that this process is smooth and reliable, as well. As a result, the number of valve seats 52a, 52b to be fed from the hopper 51a, 51b to the pallet assembly 21 is not needed to be strictly controlled, either.

Moreover, for the arrangement of the valve seats 52a, 52b the passages 61a, 61b of the chutes 31a, 31b are not inclined but squarely extended vertically, and the push plates 91a, 91b are adapted to be horizontally slidable, so that the distribution and supply of the valve sealts 52a, 52b can be performed very smoothly.

Further, in the present arrangement the passages 61a, 61b are oriented upright, whereby gravity can be effectively made use of to supply the valve seats 52a, 52b into the passages 61a, 61b, while arranging them in line, so that the feeding of the valve seats 52a, 52b to the pallet assembly 21 requires no more than a simple step of dropping the valve seats 52a, 52b in the passages 61a, 61b. Similarly, the rearrangement of the valve seats 52a, 52b as the valve seats are pushed out of the chutes 31a, 31b into the passages 61a, 61b can be automatically effected by gravity, thus eliminating the need for any particular means for shifting the valve seats 52a, 52b in the passages 61a, 61b.

Furthermore, by dimensioning the guide slots 81c for the push pieces 93a, 93b to be within the gap H1 of the corresponding communication paths 81a, 81b from the chutes 31a, 31b to the distribution plate 34, and by making the gap H2 of the guide slots 81c smaller than the gap H1 of the communication paths 81a, 81b, so that, even in the case where the communication paths 81a, 81b vertically slant across the guide slots 81c when viewed from ahead thereof, the stepped recess portions 81d of the guide slots 81c permit smooth movement of the valve seats 52a, 52b through the communication paths 81a, 81b, while securing a smooth sliding of the push plates 91a, 91b.

Still more, the lowermost communication paths 81a, 81b are formed so as to face the bottom surfaces 62a, 62b of the passages 61a, 61b of the chutes 31a, 31b of the pallet assembly 21, thereby permitting the valve seats 52a, 52b to be fed sequentially without being left in the passages 61a, 61b.

Incidentally, in the present embodiment in which the push pieces 93a, 93b are each respectively formed with a width slightly smaller than the sum of respective heights of corresponding two of the valve seats 52a, 52b, the number of valve seats to be pushed with any single push piece, as well as the width of the push piece, may be voluntarily determined in accordance with the point to be supplied with the valve seats.

Yet more, according to the present embodiment, even when the design of the cylinder head 2 is modified, accompanying changes such as in the size of valve seat, supply points, and the number of valve seats, the only required modifications are replacing the chutes 31a, 31b, distribution plate 34, and push plates 91a, 91b, that is, replacing the pallet assembly 21 consisting of such parts, so that the distribution device 11 is favorably adapted for small quantity production of many models.

In this respect, FIG. 5 shows a pallet assembly 221 application when supplying intake and exhaust valve seats to a cylinder model different from the aforementioned cylinder head 2. The pallet assembly 221 is substantially the same as the pallet assembly 21 in the transverse, longitudinal and vertical dimensions, as well as in the structure itself of the rods for push plates. However, the configuration of the push plates and the distribution plate are modified to be employed for the new cylinder model.

In the meanwhile, in the present embodiment, although the engagement grooves 71a, 71b are formed at both sides of the distribution plate 34, such grooves may be provided at one side only. Moreover, the number of valve seats to be pushed out from the chutes 31a, 31b, the configuration of the push plates 91a, 91b, and the like may be voluntarily determined in dependence on the supply points. Further, the component to be distributed is not limited to a valve seat, but may be any other component part. In this case, the configuration itself of a distribution plate is required to be adapted to the supply point, including the position of engagement grooves, while the chute configuration of a pallet assembly depends on the configuration of the distribution plate.

As will be understood from the foregoing description, according to the present invention, a set of components can be automatically supplied in a smooth and reliable manner to a plurality of supply points, even in such a case that the supply points are spaced apart by a large distance or at irregular intervals.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A component distribution device for distributing to supply a plurality of components as fed from a component source to a plurality of component supply points, comprising a base structure disposed within an effective working region of said component supply points, a pallet assembly engageable with and disengageable from said base structure, said pallet assembly having a pallet body engageable to be held with said base structure, said pallet assembly being provided with a chute for arranging said components as fed from said component source, a distribution plate operatively connected to said pallet body so as to be movable in a first direction oriented from said base structure to said component supply points, and a push member for pushing out said components of said chute toward said distribution plate, said base structure comprises a base disposed within said effective working region of said component supply points, and a mobile structure arranged on said base so as to be movable in a second direction perpendicular to said first direction, said pallet body of said pallet assembly is engaged with said mobile structure at a part of said mobile structure facing said component supply points, and said mobile structure comprises first actuating means for actuating said push member of said pallet assembly, and second actuating means for actuating to move said distribution plate to said component supply points.

2. A component distribution device according to claim 1, wherein said chute of said pallet body is adapted to vertically arrange said components as fed from said component source.

3. A component distribution device according to claim 2, wherein said distribution plate has formed in each part thereof corresponding to one of said component supply points a component engagement groove opened toward said chute, said chute has a vertical passage for vertically arranging said components as fed from said component source, and said distribution plate has at a side thereof a plurality of communication paths for connecting said vertical passage to said each component engagement groove.

4. A component distribution device according to claim 3, wherein said push member has a push piece for pushing out said components, which are located in said vertical passage of said chute at a plurality of positions corresponding each respectively to one of said communication paths, into the corresponding one of said communication paths and further into said each component engagement groove, and said push piece has a vertical width narrower than a distance from a lowermost end to an uppermost end of said components.

5. A component distribution device according to claim 4, further comprising a cover member disposed between said vertical passage of said chute and said communication paths, and said cover member being adapted to open toward and close from a side thereof facing said communication paths.

6. A component distribution device according to claim 5, wherein said distribution plate has locking means for locking to hold said components engaged with said each component engagement groove of said distribution plate.

7. A component distribution device according to claim 6, wherein said push piece of said push member has a thickness smaller than that of said vertical passage of said chute and that of each of said communication paths.

8. A component distribution device according to claim 7, further comprising a guide slot for guiding said push piece of said push member, and said guide slot being formed within said thickness of said communication paths of said distribution plate.

9. A component distribution device according to claim 9, wherein a lowest end of said vertical passage of said chute is at a level substantially equal to a lowermost end of said communication paths of said chute.

10. A component distribution device according to claim 1, further comprising third actuating means mounted on said base, for actuating to move said mobile structure in said second direction.

* * * * *

UNITED STATES PATENT AND TRADEMARK OFFICE
CERTIFICATE OF CORRECTION

PATENT NO. : 4,688,978
DATED : August 25, 1987
INVENTOR(S) : Kuniaki OHKUMA, et al It is certified that error appears in the above-identified patent and that said Letters Patent is hereby corrected as shown below:

Column 2, line 68, correct the spelling of --application--.

Column 3, line 55, change "2a" to --21a--.

Column 3, line 61, change "31b," to --33b,--.

Column 6, line 27, change "Fig. 6" to --Fig. 2--.

Column 7, line 21, change "contacted" to --contracted--.

Column 9, line 45, change "sealts" to --seats--.

Column 12, line 35, (Claim 9, line 2), change "9" to --8--.

Signed and Sealed this

Twenty-third Day of February, 1988

Attest:

DONALD J. QUIGG

*Attesting Officer*   *Commissioner of Patents and Trademarks*